(12) United States Patent (10) Patent No.: US 12,627,234 B2
Javora et al. (45) Date of Patent: May 12, 2026

---

(54) POWER CONVERSION SYSTEM

(71) Applicant: ABB Schweiz AG, Baden (CH)

(72) Inventors: Radek Javora, Hrusovany u Brna
(CZ); Carlos David Martinez Nieto,
Tallinn (EE); Andreas Brandt,
Düsseldorf (DE)

(73) Assignee: ABB Schweiz AG, Baden (CH)

( * ) Notice: Subject to any disclaimer, the term of this
patent is extended or adjusted under 35
U.S.C. 154(b) by 0 days.

(21) Appl. No.: 18/782,650

(22) Filed: Jul. 24, 2024

(65) Prior Publication Data

US 2024/0380326 A1      Nov. 14, 2024

Related U.S. Application Data

(63) Continuation of application No.
PCT/EP2023/050100, filed on Jan. 4, 2023.

(30) Foreign Application Priority Data

Jan. 24, 2022    (EP) ................................... 22152990

(51) Int. Cl.
*H02M 3/24*         (2006.01)
*H02J 3/00*         (2026.01)
*H02J 3/007*        (2026.01)

(52) U.S. Cl.
CPC .............. *H02M 3/24* (2013.01); *H02J 3/007*
(2020.01)

(58) Field of Classification Search
None
See application file for complete search history.

(56) References Cited

U.S. PATENT DOCUMENTS

2021/0203165 A1      7/2021  Erokhovets
2022/0269325 A1*     8/2022  Huang .................. H02M 3/155
(Continued)

FOREIGN PATENT DOCUMENTS

CN       110126658 A  *  8/2019  .............. B60L 53/20
CN       111900884 A     11/2020
(Continued)

OTHER PUBLICATIONS

European Patent Office, Extended European Search Report in
European Patent Application No. 22152990.2, 9 pp. (Jun. 20, 2022).
(Continued)

*Primary Examiner* — Daniel Cavallari
*Assistant Examiner* — Joel Barnett
(74) *Attorney, Agent, or Firm* — Fitch Even Tabin &
Flannery LLP

(57)                ABSTRACT

A power conversion system includes a high voltage (HV)
switchgear; a solid-state transformer; and a low voltage (LV)
switchgear. The HV switchgear connects to and disconnects
from a HV network. The HV switchgear connects to an input
of the solid-state transformer, which comprises first and
second modules. The first module converts an HV alternat-
ing current (AC) signal into a HV DC signal, and the first
module converts an HV DC signal into an HV AC signal.
The second module converts an HV DC signal into at least
one LV DC signal, and the second module converts at least
one LV DC signal into an HV DC signal. The LV switchgear
connects to an output of the solid-state transformer. The LV
switchgear connects to a plurality of applications or devices
and disconnects from the plurality of applications or
devices.

15 Claims, 6 Drawing Sheets

(56) References Cited

U.S. PATENT DOCUMENTS

| | | | | |
|---|---|---|---|---|
| 2022/0348100 A1* | 11/2022 | Keister | ............ | H02M 3/33573 |
| 2023/0352934 A1* | 11/2023 | Steimer | ................... | H02J 1/102 |
| 2024/0088798 A1* | 3/2024 | Shuai | .................... | H02M 3/335 |

FOREIGN PATENT DOCUMENTS

| | | | |
|---|---|---|---|
| CN | 112072719 A | 12/2020 |
| CN | 112165083 A | 1/2021 |
| EP | 3985823 A1 | 4/2022 |
| WO | WO 2013/002438 A1 | 1/2013 |

OTHER PUBLICATIONS

European Patent Office, International Search Report in International Patent Application No. PCT/EP2023/050100, 4 pp. (Mar. 13, 2023).
European Patent Office, Written Opinion in International Patent Application No. PCT/EP2023/050100, 7 pp. (Mar. 13, 2023).

* cited by examiner

- PRIOR ART -

POWER CONVERSION SYSTEM

CROSS-REFERENCE TO RELATED APPLICATIONS

The instant application claims priority to International Patent Application No. PCT/EP2023/050100, filed Jan. 4, 2023, and to European Patent Application No. 22152990.2, filed Jan. 24, 2022, each of which is incorporated herein in its entirety by reference.

FIELD OF THE DISCLOSURE

The present invention relates to a power conversion system.

BACKGROUND OF THE INVENTION

In a general aspect, power conversion requires there to be several independent devices involved. Power comes from a medium voltage (MV) or high voltage (HV) network to a power transformer, which converts the voltage to a low voltage (LV) level, which is still at a frequency of a power system that provided the power. This LV alternating current (AC) output is then converted to a LV direct current (DC) output and such a LV DC signal is then further used for LV applications.

A conventional layout of HV or MV AC to LV DC power conversion is shown in FIG. 1. Such a low frequency (typically within 2-200 Hz) power transformer can also provide galvanic insulation between the LV DC network/application and the HV/MV grid for safety purposes. Nevertheless, this bulky power transformer occupies a large space within an overall conversion system, consumes a lot of raw materials, has significant weight, and creates power losses.

Furthermore, power flow is enabled only in one direction, i.e. from the HV network to the LV DC application that is consuming generated power. Each LV DC application needs its own DC power supply supporting a particular voltage/current rating or it needs to be powered from the HV network, which results in many devices installed in the network.

BRIEF SUMMARY OF THE INVENTION

It would be advantageous to have an improved technique to more flexibly convert power. In a first aspect, there is provided a power conversion system, comprising: a high voltage (HV) switchgear, a solid-state transformer (SST), and a low voltage (LV) switchgear. The HV switchgear is configured to connect to a high voltage (HV) network and disconnect from the HV network. The HV switchgear is configured to connect to an input of the solid-state transformer. The solid-state transformer comprises a first module and a second module connected to the first module.

The first module is configured to convert a high voltage alternating current (HV AC) signal into a high voltage direct current (HV DC) signal, and the first module is configured to convert a HV DC signal into a HV AC signal. The second module is configured to convert a HV DC signal into at least one low voltage direct current (LV DC) signal, and the second module is configured to convert at least one LV DC signal into a HV DC signal. The LV switchgear is configured to connect to an output of the solid-state transformer. The LV switchgear is configured to connect to a plurality of applications or devices and configured to disconnect from the plurality of applications or devices. The system is configured to transfer power from the HV network to the plurality of applications or devices. The system is configured to transfer power from the plurality of applications or devices to the HV network.

BRIEF DESCRIPTION OF THE SEVERAL VIEWS OF THE DRAWING(S)

Figures 7A, 7B:
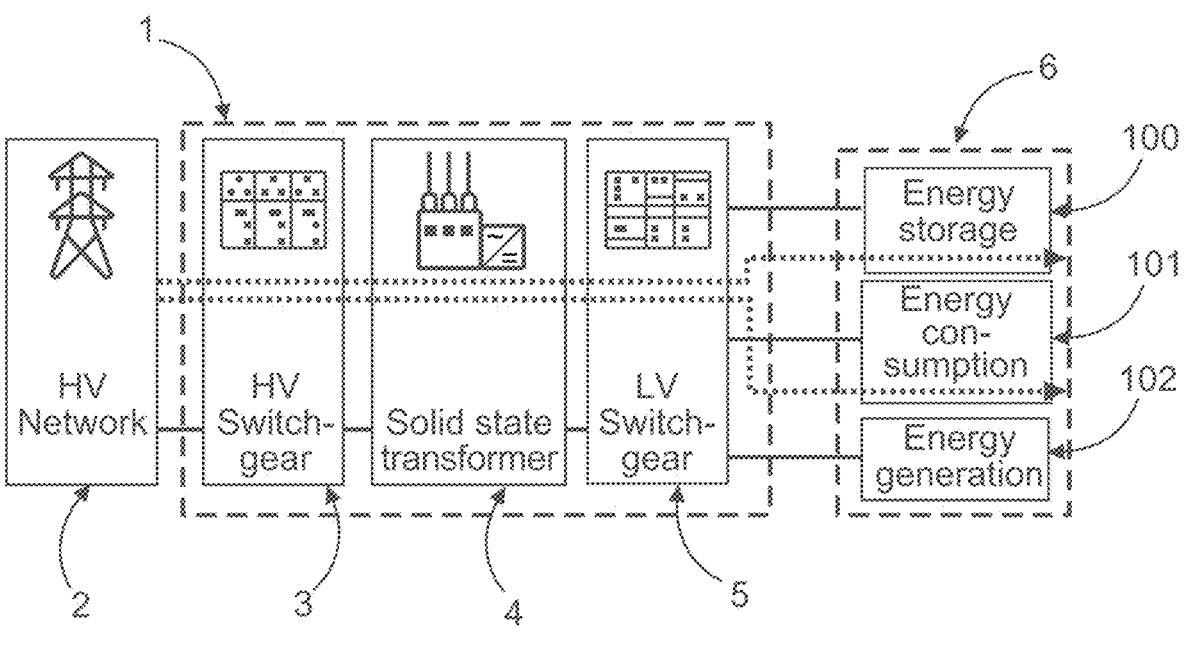

FIG. 7*a* is a schematic representation of a new power conversion system with power flow from a HV (or MV) network towards applications or devices consuming power in accordance with the disclosure.

FIG. 7*b* is a schematic representation of a new power conversion system with power flow from applications or devices where power is available to a HV (or MV) network in accordance with the disclosure.

Figure 7C:
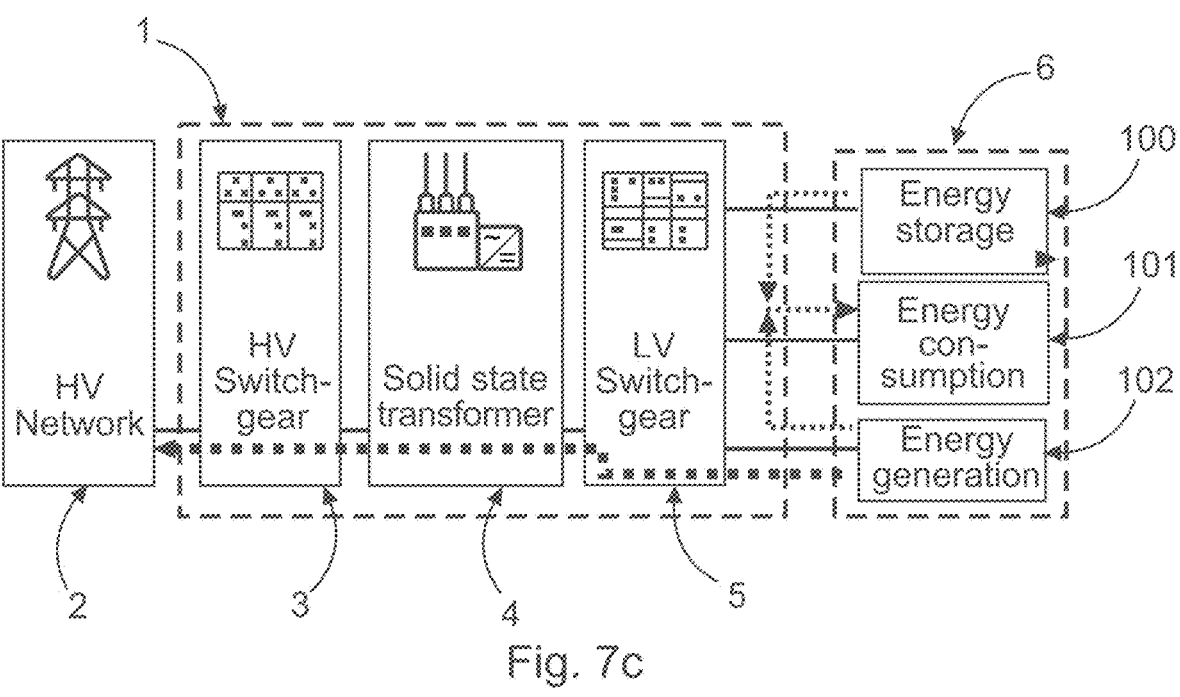

FIG. 7*c* is a schematic representation of a new power conversion system with power flow between applications or devices in accordance with the disclosure.

Figure 7D:
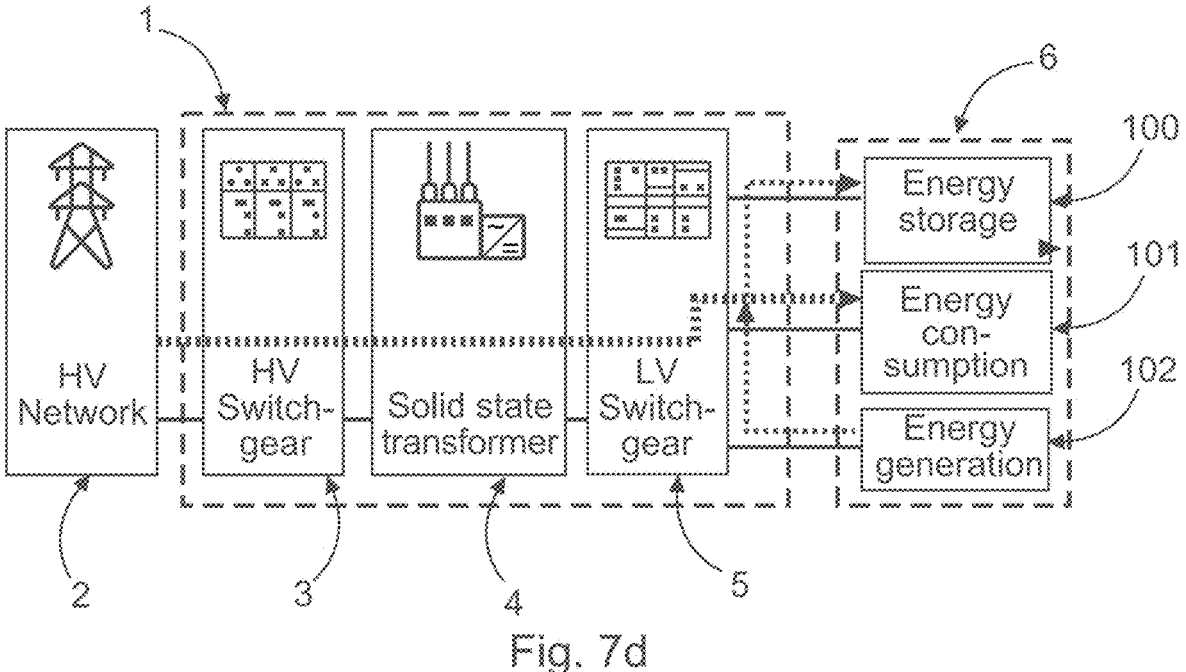

FIG. 7*d* is a schematic representation of a new power conversion system with power flow from several possible sources in accordance with the disclosure.

Figure 7E:
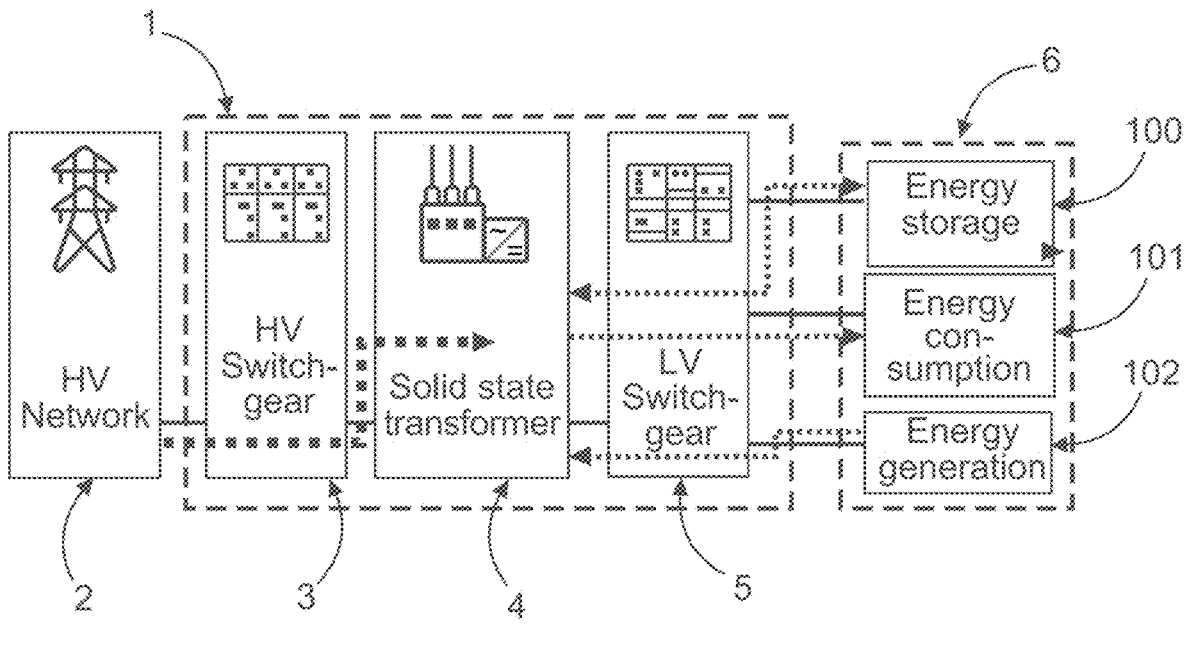

FIG. 7*e* is a schematic representation of a new power conversion system with mixed power flow from several possible sources in accordance with the disclosure.

DETAILED DESCRIPTION OF THE INVENTION

FIGS. 2-7 relate to a new power conversion system 1. The power conversion system 1 comprises a high voltage (HV) switchgear 3, a solid-state transformer 4, and a low voltage (LV) switchgear 5. The HV switchgear 3 is configured to connect to a high voltage (HV) network 2 and disconnect from the HV network (2). The HV switchgear 3 is configured to connect to an input of the solid-state transformer 4. The solid-state transformer 4 comprises a first module 11 and a second module 12 connected to the first module. The first module 11 is configured to convert a high voltage alternating current (HV AC) signal into a high voltage direct current (HV DC) signal, and the first module 11 is configured to convert a HV DC signal into a HV AC signal. The second module 12 is configured to convert a HV DC signal into at least one low voltage direct current (LV DC) signal, and the second module 12 is configured to convert at least one LV DC signal into a HV DC signal. The LV switchgear 5 is configured to connect to an output of the solid-state transformer 4. The LV switchgear 5 is configured to connect to a plurality of applications or devices 6 and configured to disconnect from the plurality of applications or devices 6. The system is configured to transfer power from the HV network to the plurality of applications or devices. The system is configured to transfer power from the plurality of applications or devices to the HV network.

It is to be noted that in this disclosure "high voltage" (HV) is used to mean high voltage and/or medium voltage.

It is to be noted that in this disclosure "medium voltage" (MV) is used to mean high voltage and/or medium voltage.

In an example, the system is configured to transfer power from the plurality of applications or devices generating the power, plus power from the HV network, to the plurality of applications or devices that are consuming the power.

In an example, the system further comprises a housing enclosure within which the HV switchgear 3, the solid-state transformer 4, and the LV switchgear 5 are arranged.

In an example, the system further comprises a housing enclosure within which at least the solid-state transformer 4 is arranged.

In an example, the system is a three-phase system or station.

In an example, the solid-state transformer 4 is built out of three single-phase units configured to be operated independently.

In an example, the system is configured to receive power from at least one auxiliary power supply 7 for control and/or communication circuits.

In an example, the system comprises a control system (8) for control, data acquisition, and communication functionality.

According to an example, the system is configured to transfer power from the HV network to one or more of the plurality of applications or devices. To do this the HV switchgear 3 is configured to connect to the high voltage (HV) network 2. The first module 11 is configured to convert a high voltage alternating current (HV AC) signal from the HV network into a high voltage direct current (HV DC) signal. The second module 12 is configured to connect to an output of the first module 11 and convert the HV DC signal from the first module 11 into at least one low voltage direct current (LV DC) signal. The second module 12 comprises at least one sub-module 13, and each sub-module 13 is configured to convert the HV DC signal from the first module 11 into a LV DC signal. The LV switchgear 5 is configured to connect to the one or more of the plurality of applications or devices 6. The LV switchgear 5 comprises a plurality of switches, and each switch is configured to connect to an application or device 6 or its group. The LV switchgear 5 is configured to connect the at least one LV DC signal from the second module 12 to the one or more of the plurality of applications or devices 6.

It is to be noted that reference to a "switch" with respect to the LV switchgear comprising a plurality of switches, and where each switch is connected to an application or device, means a switch in terms of any type of switch and/or a circuit breaker and/or a fuse or fuses.

In an example, the LV switchgear is configured to connect the at least one LV DC signal from the second module to one or more of the plurality of applications or devices Also, plurality of applications or devices 6 can be for example data center(s), windmill(s), railway(s), and photovoltaic grid connection(s). These are just exemplary applications and devices, and others can be connected to and disconnected from. In general, these applications or devices 6 could be related to energy consumption, generation and/or storage.

According to an example, each sub-module 13 comprises a DC to AC converter 14, a medium frequency transformer 15 and an AC to DC converter 16. The DC to AC converter 14 is configured to convert the HV DC signal from the first module 11 into a HV AC signal with higher frequency (typically within 300 Hz-3000 kHz) than the HV or MV frequency from the power network. The medium frequency transformer 15 is configured to convert the HV AC signal from the DC to AC converter 14 into a LV AC signal. The AC to DC converter 16 is configured to convert the LV AC signal from the medium frequency transformer 15 into the LV DC signal to be provided to the one or more of the plurality of applications or devices.

In an example, the medium frequency transformer 15 is configured to provide galvanic insulation.

According to an example, the system is configured to transfer power from one or more of the plurality of applications or devices to the HV network. To do this the LV switchgear 5 is configured to connect to the one or more of the plurality of applications or devices 6. The LV switchgear 5 comprises a plurality of switches, and each switch is configured to connect to an application or device 6. The LV switchgear 5 is configured to connect at least one LV DC signal from the one or more of the plurality of applications or devices 6 to the second module 12. The second module 12 is configured to convert the at least one LV DC signal from the one or more of the plurality of applications or devices 6 into a HV DC signal. The second module 12 comprises at least one sub-module 13, and each sub-module 13 is configured to convert a LV DC signal into a HV DC signal. The first module 11 is configured to connect to the second module 12 and convert the HV DC signal into a "HV AC" signal. The HV switchgear 3 is configured to connect the HV AC signal from the first module 11 to the HV network 2.

It is to be noted that reference to a "switch" with respect to the LV switchgear comprising a plurality of switches, and where each switch is connected to an application or device, means a switch in terms of any type of switch and/or a circuit breaker and/or a fuse or fuses.

According to an example, each sub-module 13 comprises an AC to DC converter 14, a medium frequency transformer 15 and a DC to AC converter 16. The DC to AC converter 16 is configured to convert the LV DC signal from an application or device 6 into a LV AC signal. The medium frequency transformer 15 is configured to convert the LV AC signal from the DC to AC converter 16 into a HV AC signal. The AC to DC converter 14 is configured to convert the HV AC signal from the medium frequency transformer into the HV DC signal to be provided to the first module 11.

According to an example, the LV switchgear is configured to connect the LV DC signal from each sub-module 13 or group of sub-modules 13 to the plurality of applications or devices 6.

According to an example, the LV switchgear is configured to connect to the plurality of applications or devices 6. The LV switchgear 5 is configured to connect a plurality of LV DC signals from the plurality of applications or devices 6 to the second module 12.

According to an example, the system is configured to transfer power from the HV network 2 to one or more of the plurality of applications or devices 6 and at the same time transfer power from a different one or more of the plurality of applications or devices 6 to the HV network 2.

According to an example, the LV switchgear 5 is configured to connect to two or more applications or devices 6 of the plurality of applications or devices 6 to connect the two or more applications or devices 6 to each other.

According to an example, the LV switchgear 5 is configured to disconnect power from the solid-state transformer 4.

According to an example, when power is disconnected from the solid-state transformer 4 the LV switchgear is configured to connect the two or more applications or devices 6 to each other.

According to an example, the second module 12 is configured to utilize a number of sub-modules 13 in series or parallel dependent upon a power demand to the plurality of applications or devices 6.

According to an example, the second module 12 is configured to utilize a number of sub-modules 13 in series or parallel dependent upon a power demand from the plurality of applications or devices 6.

According to an example, the solid-state transformer 4 is configured to utilize a number of second modules 12 in parallel dependent upon a power demand to and/or from the plurality of applications or devices 6.

In an example, the system 1 is configured to transfer power from one or more of the plurality of applications or devices 6 generating the power, add power from the HV network 2 and supply the total power to the plurality of applications or devices 6 that are consuming the power. The LV switchgear 5 is configured to connect to the one or more of the plurality of applications or devices 6 generating the power. The LV switchgear 5 comprises a plurality of switches, and each switch is configured to connect to an application or device 6. The LV switchgear 5 is configured to connect at least one LV DC signal from the one or more of the plurality of applications or devices 6 generating the power to the second module 12. The second module 12 is configured to convert the at least one LV DC signal from the one or more of the plurality of applications or devices 6 into a HV DC signal. The second module 12 comprises at least one sub-module 13, and each sub-module 13 is configured to convert a LV DC signal into a HV DC signal. The first module 11 is configured to convert a high voltage alternating current (HV AC) signal from the HV network 2 into a high voltage direct current (HV DC) signal.

Figure 4:
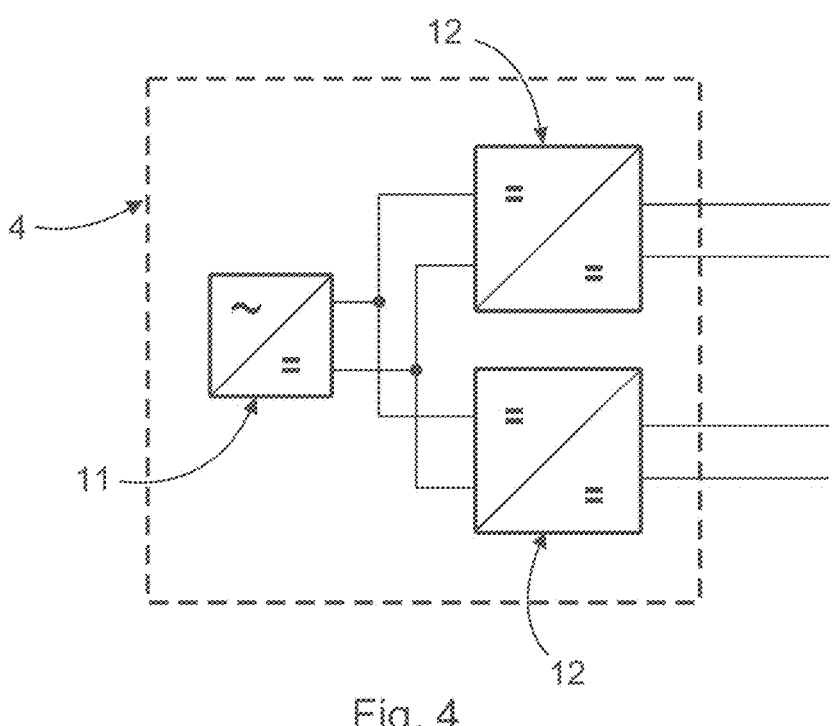
FIG. 4 is a schematic representation of an architecture of a solid-state transformer of a new power conversion system in accordance with the disclosure.

Thus, the power from HV network 2 and the power from plurality of applications or devices 6 generating the power merges in the interconnection point between the first and the second module of solid state transformer 4 and provide such total power to the other portion of second modules 12 connected to this point in parallel, see e.g. FIG. 4. This branch is then connected through the LV switchgear 5 to the plurality of applications or devices 6 consuming the power. Similar concept of power exchange can be realized by using sub-modules 13, each connected to a different group of connected devices through a LV switchgear 5.

In an example, for the provision of LV AC auxiliary power one or more DC to AC converters 30 are located between the second module 12 and the LV switchgear 5 or the one or more DC to AC converters 30 are located on output connections of the LV switchgear 5.

Thus, a new system is provided of low voltage DC power conversion from or to the medium or high voltage AC network, enabling unidirectional or bi-directional power flow or mixed power supply.

The new power conversion system can fulfill application requirements as well all aspects related to interconnection of LV DC with HV AC grid with a minimized footprint, enabling uni-directional as well as bi-directional power flow and easy operation and control of renewables into HV/MV distribution networks.

The power conversion system is now described in specific detail, where again reference is made to FIGS. 2-7.

Figure 1:
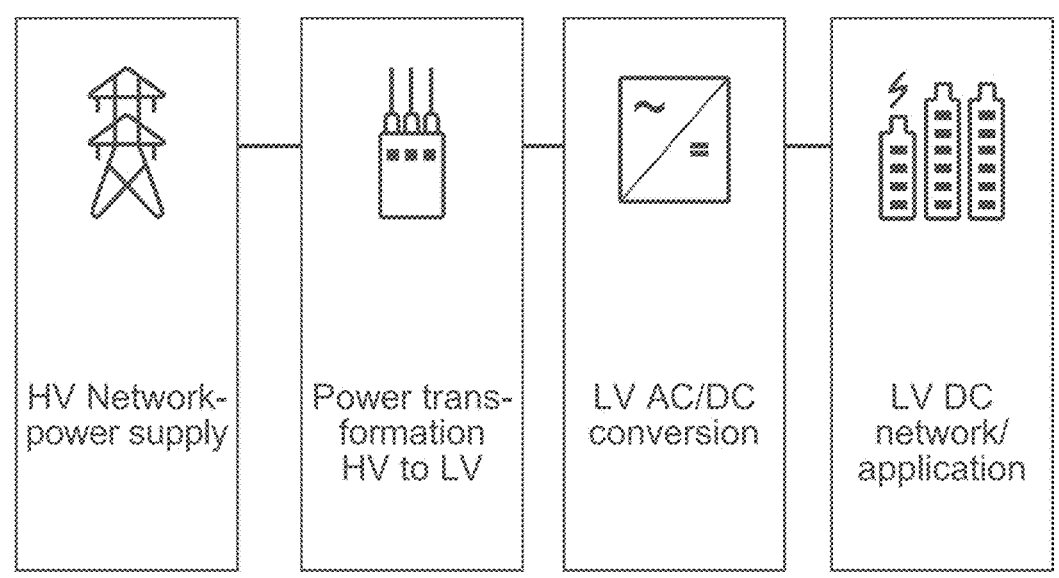
FIG. 1 is a diagram of a conventional layout of HV or MV AC to LV DC power conversion in accordance with the state of the art.
Figure 2:
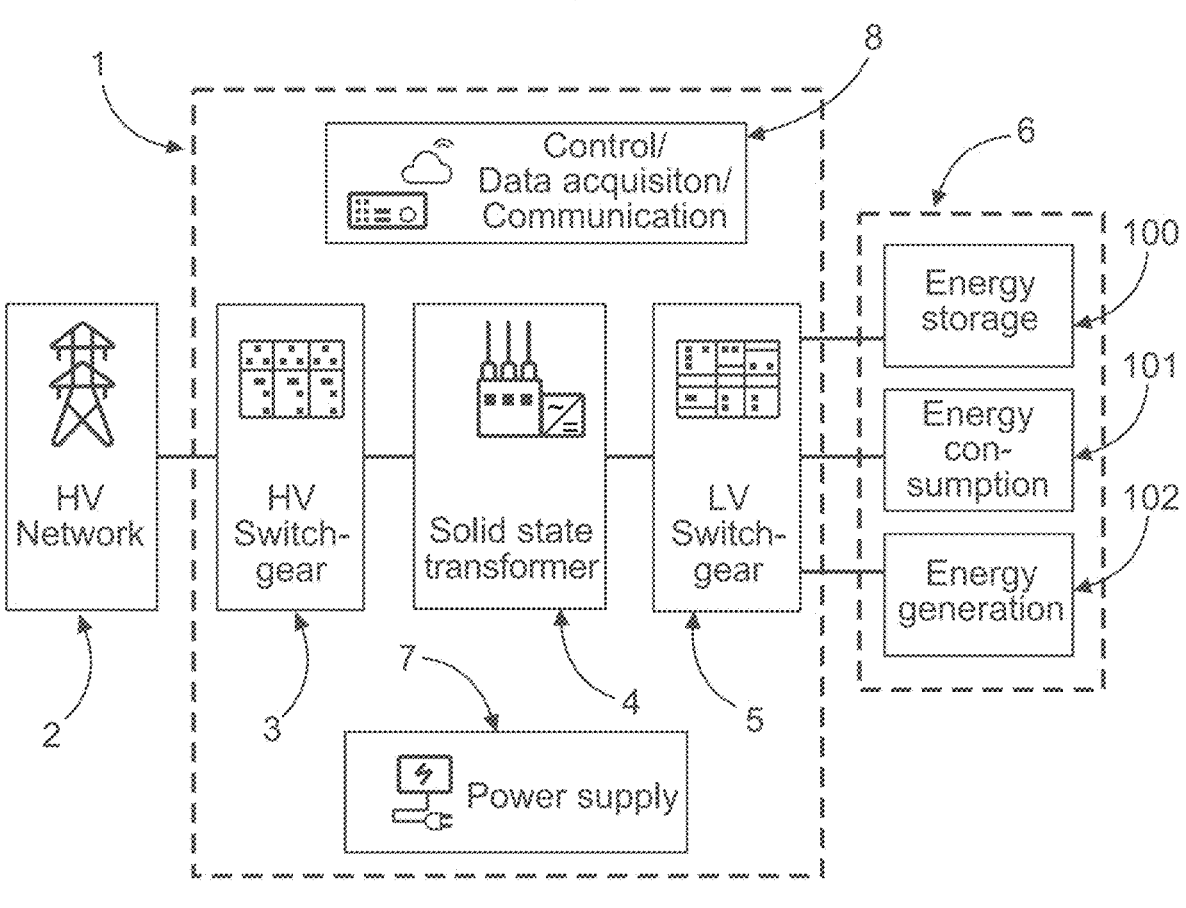
FIG. 2 is a schematic representation of a new power conversion system in accordance with the disclosure.

In FIG. 2, reference numerals are shown which represent the following:

1—AC/DC converter station/power conversion system
2—HV network
3—HV switchgear (HV SWG)
4—Solid state transformer (SST) providing galvanic insulation
5—LV switchgear (LV SWG)
6—Connected devices
7—Auxiliary power supply for control circuits
8—Overall control system with optional data acquisition and communication (to cloud)
100—Energy storage equipment (e.g. battery storage or other)
101—Energy consumption equipment (e.g. Datacenter, EV charging or other)
102—Energy generation equipment (e.g. renewables=solar/wind power plant or other)

The power conversion system 1 shown in FIG. 2 can also be termed an AC/DC converter station 1 which is connected to a medium or high voltage AC network 2. A first part of the converter station (power conversion system) is a medium or high voltage (here generally termed HV) switchgear 3, that can connect to or disconnect from the HV network 2 by means of circuit breakers, dis-connectors or switches that interrupt the main circuit. The HV switchgear 3 can also contain other protection or safety devices such as a surge arrester or earthing switch that can protect connected devices from excessive signals coming from the distribution network and/or protect personnel during required maintenance, repair, or service activities. A second part of AC/DC converter station 1 (power conversion system) is a solid-state power transformer (SST) 4. The SST 4 typically converts HV alternating current (AC) into a low voltage (LV) direct current (DC), involving galvanic insulation. Such output is then distributed inside of a LV switchgear 5 that distributes the output signal to various applications or connected devices 6 as well as providing necessary measurements, switching operations and safety features. The LV switchgear 5 can also interconnect various connected devices 6 together, creating a simple micro-grid, without involving the rest of the AC/DC converter station 1, e.g. a photovoltaic power plant 102 can be connected to supply power to an electric battery storage 100.

The AC/DC converter station 1 (power conversion system) further comprises an auxiliary power supply 7 for energizing the control devices within the whole or a part of the station 1. It can also be used to energize data acquisition devices as well as a control/communication infrastructure 8, thus enabling remote control of the substation that is otherwise not energized.

Figure 3:
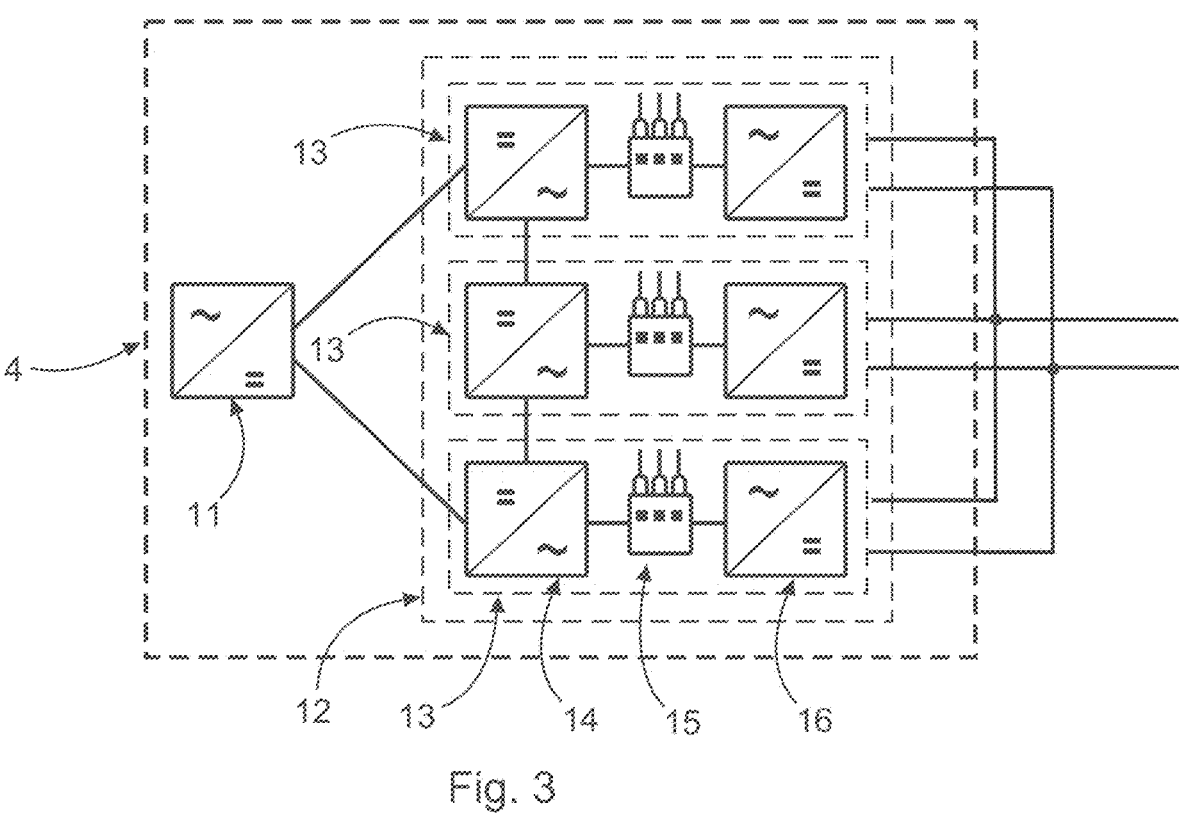
FIG. 3 is a schematic representation of a solid-state transformer of a new power conversion system in accordance with the disclosure.

There exist several possible designs of what is called the "solid state transformer" (SST) 4, but the topology described in FIG. 3 is especially beneficial for application in the AC/DC converter station (power conversion system), due to its small footprint and simple construction having significantly reduced number of components, thus improving reliability.

In FIG. 3, reference numerals are shown which represent the following:

4—Solid-state transformer (SST)
11—First module (converts HV AC to HV DC signal)
12—Second module (voltage scaling/transformation)
13—Sub-module
14—DC to AC converter (medium frequency)
15—Medium frequency transformer (MFT)
16—AC to DC converter (low voltage)

The solid state transformer 4 shown in FIG. 3 consists of two modules 11 and 12. The first module 11 converts typical HV AC signal into HV DC signal or backwards. The second module 12 consists of several, in series connected, submodules 13. Each submodule 13 converts a HV DC signal into a HV AC signal through a DC to AC converter 14, then provides galvanic insulation within a medium frequency transformer 15 and converts the medium frequency AC signal into DC signal at a low voltage level. The output of all sub-modules 13 is connected in parallel either within the SST 4 and then goes into the LV switchgear 5, or connection of sub-modules 13 is done within the LV switchgear 5.

Another mechanism by which the solid-state transformer (SST) can target higher power applications is to use plurality of second modules 12 connected in parallel. This is illustrated in FIG. 4, which shows schematics of an SST architecture with multiple second modules with DC output. In this case, each parallel second module 12 branch can serve different applications, but the first module 11 is designed to be able to carry the full total power of the SST 4.

Figure 5:
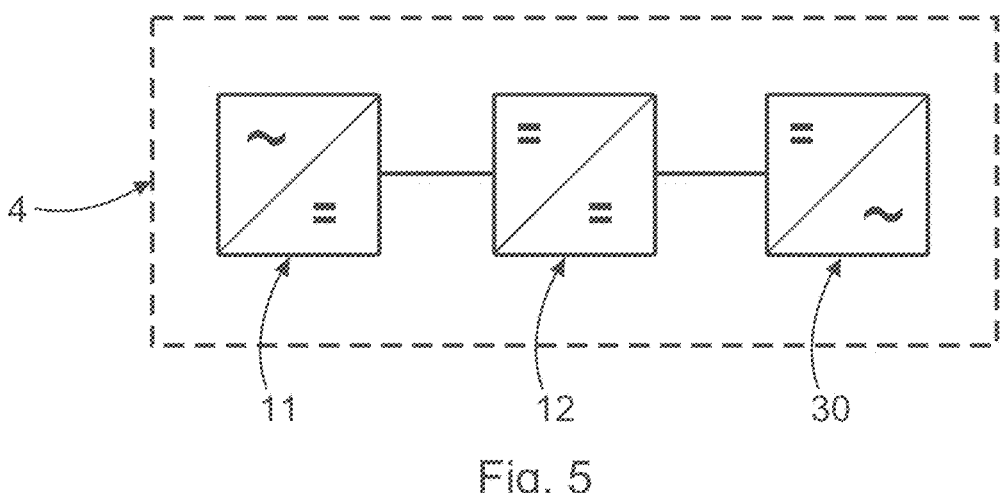
FIG. 5 is a schematic representation of an architecture of a solid-state transformer of a new power conversion system for AC applications in accordance with the disclosure.

The SST 4 can be configured to convert DC to AC power, in order that it can be connected to LV AC applications, and therefore is not limited to the DC only. Nevertheless, also for this case, the high-level topology of the described converter station 1 can remain the same, with an additional block of DC to AC conversion 30. As shown in FIG. 5 the DC to AC conversion 30 can be added to the SST or as shown in FIG. 6 the DC to AC conversion 30 can be connected to one or more of the outputs from LV switchgear 5, or can if necessary be located close to the application 6.

Figure 6:
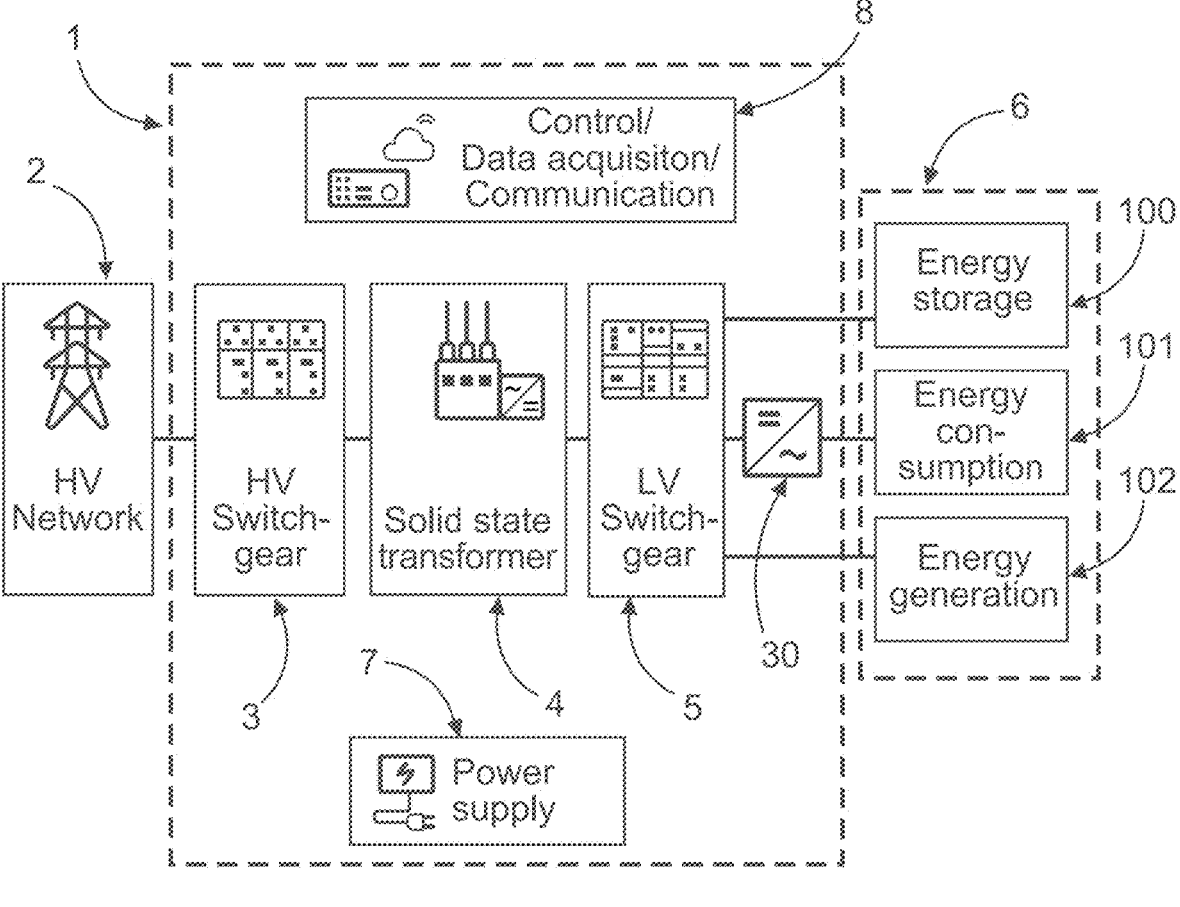
FIG. 6 is a schematic representation of a new power conversion system for AC and DC applications in accordance with the disclosure.

In FIG. 6, a reference numeral is shown which represents the following: 30-LV DC to AC conversion unit Depending on power requirements of different applications, power flow through at least a portion of the AC/DC converter station (power conversion system) 1 can be set. An advantage of utilizing a LV switchgear (SWG) 5 to connect the applications 6 is that the LV SWG 5 can freely configure the energy flow for each particular application 100, 101 and/or 102, based on the power available. Furthermore, all types of mentioned connected devices 6 might not always be connected.

Examples of possible scenarios for power flow are shown in FIGS. 7a-7c.

Unidirectional power flow as shown in FIG. 7a) is applicable in cases where energy storage 100 and energy consumption 101 devices are powered from the HV/MV network 2 through the AC/DC converter station (power conversion system) 1. An example of the energy storage device 100 can be for example battery storage or any other kind of technology for energy storage, which is, in this case, being charged from HV/MV network 2. An example of an energy consumption device 101 can be for example datacenters, charging station of electric vehicles or any other type of devices that need to be powered using LV DC signal.

Another type of unidirectional power flow, but going in opposite direction, is shown in FIG. 7b). This represents a situation when the energy storage device 100 is at least partly charged and thus can supply power into the HV/MV network 2 when there is a high need. The same can be done with energy originating within the energy generation devices 102, such as wind turbines or solar power plants.

Advantage of the power conversion system 1 are further shown in the configuration shown in FIG. 7c), d) and e).

In the situation where there is a high amount of power available from the energy generating devices 102, capable of powering the actual needs of energy storage devices 100 and/or energy consuming devices 101, the power does not need to flow into the HV/MV network 2 or not even to any part of the solid-state transformer 4, but can flow only through the LV switchgear 5. This case is represented by FIG. 7c). If necessary the excess of energy available from the energy generating devices 102, or energy storage 100 when charged, can be transferred though the solid-state transformer 4 and HV/MV switchgear 3 into the HV/MV network 2.

Situations with high power demand are represented in FIG. 7d). In these cases, energy generating devices 102 are capable of providing only a portion of the power required by the other devices 6 connected to the LV switchgear 5. The remaining power can then be supplied through the solid-state transformer 4 and HV/MV switchgear 3 from the HV/MV network 2.

In situation when the connected devices 6 are each connected through the LV switchgear 5 to the single second module 12 or submodule 13, the power mix can be done within the solid-state transformer 4 as well.

Thus, in a detailed embodiment an AC/DC converter station 1, also termed a power conversion system, has a solid-state transformer 4. The solid-state transformer 4 is build out of several modules. A first module 11 of the SST 4 is for converting a HV AC signal into a HV DC signal and it is designed for maximum parameters of the solid state transformer 4. At least one second module 12 of the SST 4 is used for voltage scaling, comprising at least one submodule 13 containing a DC/AC converter 14, medium frequency transformer 15 and AC/DC converter 16. The AC/DC converter station 1 also has a high voltage switchgear 3 that is connected to the input of the solid-state transformer 4, with at least one switching and/or protection device. The AC/DC converter station 1 also has a low voltage switchgear 5, connected to the output of the solid-state transformer 4, with plurality of switches, each connected to a different users or applications 6. The AC/DC converter station 1 also has an overall control system 8 with data acquisition and communication, and an auxiliary power supply 7 for control and/or communication circuits In this detailed embodiment the solid-state transformer 4 is designed to transfer power from a HV/MV AC system to a LV DC system.

In this detailed embodiment, the solid-state transformer 4 is designed to transfer power from the LV DC system to the HV/MV AC system.

The second module 12 of the solid-state transformer 4 has at least one sub-module 13 that enables unidirectional power flow.

The output switches of sub-module 13, when used, can be replaced by diodes.

The second module 12 of the solid-state transformer 4 has at least one sub-module 13 that enables bi-directional power flow.

Each switch within LV switchgear 5 arrangement is connected to a single sub-module 13 of the second module 12 of the solid-state transformer 4 and enables switching its connected device 6 with or without dependency on the status of the other sub-modules 13.

Each connected device 6 or group of connected devices 6 linked to the LV switchgear 5 is connected to a single switch within LV switchgear 5 assembly and enables its switching with or without dependency on the other connected devices 6.

The LV switchgear 5 has a functionality of interconnecting at least two of the connected devices 6 together, without power passing through the solid-state transformer 4.

The second module 12 of the solid-state transformer 4 has a functionality to add more series or parallel connected sub-modules 13 later, when there is an increased power demand to/from LV connected devices 6.

The solid-state transformer 4 has a functionality to add more parallel connected second modules 12 when there is an increased power demand to/from LV connected devices 6.

The sub-modules 13 in the second module 12 of the solid-state transformer 4 can be designed for a particular voltage level and when more of them is connected in series the higher AC system voltage could be applied.

An additional LV DC to AC converter 30 can be located outside the low voltage switchgear 5 and is unidirectional, when connected to the LV AC energy consuming 101 or LV AC energy generating 102 applications.

The AC/DC converter station (power conversion system) 1 can be a three-phase station/system.

The AC/DC converter station (power conversion system) can be a three-phase station wherein the solid-state transformer 4 can be built out of three single-phase units that can be operated independently or as a three-phase system.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the system is configured to transfer power from the plurality of applications or devices generating the power, plus power from the HV network, to the plurality of applications or devices that are consuming the power.

In an example, the system is configured to transfer power from the HV network to one or more of the plurality of applications or devices. The HV switchgear is configured to connect to the high voltage (HV) network. The first module is configured to convert a high voltage alternating current (HV AC) signal from the HV network into a high voltage direct current (HV DC) signal. The second module is configured to connect to an output of the first module and convert the HV DC signal from the first module into at least one low voltage direct current (LV DC) signal. The second module comprises at least one sub-module, and each sub-module is configured to convert the HV DC signal from the first module into a LV DC signal. The LV switchgear is configured to connect to the one or more of the plurality of applications or devices. The LV switchgear comprises a plurality of switches, and each switch is configured to connect to an application or device. The LV switchgear is configured to connect the at least one LV DC signal from the second module to the one or more of the plurality of applications or devices.

In an example, each sub-module comprises a DC to AC converter, a medium frequency transformer and an AC to DC converter. The DC to AC converter is configured to convert the HV DC signal from the first module into a HV AC signal with higher frequency (typically within 300 Hz-3000 kHz) than the HV or MV frequency from the power network. The medium frequency transformer is configured to convert the HV AC signal from the DC to AC converter into a LV AC signal. The AC to DC converter is configured to convert the LV AC signal from the medium frequency transformer into the LV DC signal to be provided to the one or more of the plurality of applications or devices.

In an example, the system is configured to transfer power from one or more of the plurality of applications or devices to the HV network. The LV switchgear is configured to connect to the one or more of the plurality of applications or devices. The LV switchgear comprises a plurality of switches, and each switch is configured to connect to an application or device. The LV switchgear is configured to connect at least one LV DC signal from the one or more of the plurality of applications or devices to the second module. The second module is configured to convert the at least one LV DC signal from the one or more of the plurality of applications or devices into a HV DC signal. The second module comprises at least one sub-module, and each sub-module is configured to convert a LV DC signal into a HV DC signal. The first module is configured to connect to the second module and convert the HV DC signal into a HV AC signal. The HV switchgear is configured to connect the HV AC signal from the first module to the HV network.

In an example, each sub-module comprises an AC to DC converter, a medium frequency transformer and a DC to AC converter. The DC to AC converter is configured to convert the LV DC signal from an application or device into a LV AC signal. The medium frequency transformer is configured to convert the LV AC signal from the DC to AC converter into a HV AC signal. The AC to DC converter is configured to convert the HV AC signal from the medium frequency transformer into the HV DC signal to be provided to the first module.

In an example, the system is configured to transfer power from one or more of the plurality of applications or devices generating the power, add power from the HV network and supply total power to the plurality of applications or devices that are consuming the power. The LV switchgear is configured to connect to the one or more of the plurality of applications or devices generating the power. The LV switchgear comprises a plurality of switches, and each switch is configured to connect to an application or device. The LV switchgear is configured to connect at least one LV DC signal from the one or more of the plurality of applications or devices generating the power to the second module. The second module is configured to convert the at least one LV DC signal from the one or more of the plurality of applications or devices into a HV DC signal. The second module comprises at least one sub-module, and each sub-module is configured to convert a LV DC signal into a HV DC signal. The first module is configured to convert a high voltage alternating current (HV AC) signal from the HV network into a high voltage direct current (HV DC) signal.

Thus, the power from HV network and the power from plurality of applications or devices generating the power merges in the interconnection point between first and second module of solid state transformer and provide such total power to the other portion of second modules connected to this point in parallel. This branch is then connected through the LV switchgear to the plurality of applications or devices consuming the power. Similar concept of power exchange can be realized by using sub-modules, each connected to a different group of connected devices through a LV switchgear.

Thus in effect the first module is a high voltage AC to DC converter that can also operate in a reverse mode and is a high voltage DC to AC converter.

Thus, in effect the second module is a DC high voltage to low voltage transformer that cam also operate in an opposite energy flow direction and is a DC low voltage to high voltage transformer.

The first module can be set up to operate in parallel, and operate as a high voltage AC to DC converter and at the same time operate as a high voltage DC to AC converter.

In an example, the LV switchgear is configured to connect the LV DC signal from each sub-module to the plurality of applications or devices.

In an example, the LV switchgear is configured to connect to the plurality of applications or devices. The LV switchgear is configured to connect a plurality of LV DC signals from the plurality of applications or devices to the second module.

In an example, the system is configured to transfer power from the HV network to one or more of the plurality of applications or devices and at the same time transfer power from a different one or more of the plurality of applications or devices to the HV network.

In an example, the LV switchgear is configured to connect to two or more applications or devices of the plurality of applications or devices to connect the two or more applications or devices to each other.

In an example, the LV switchgear is configured to disconnect from the solid-state transformer.

In an example, when disconnected from the solid-state transformer the LV switchgear is configured to connect the two or more applications or devices to each other.

In an example, the second module is configured to utilize a number of sub-modules in series or parallel dependent upon a power demand to the plurality of applications or devices.

In an example, the second module is configured to utilize a number of sub-modules in series or parallel dependent upon a power demand from the plurality of applications or devices.

In an example, the solid-state transformer is configured to utilize a number of second modules in parallel dependent upon a power demand to and/or from the plurality of applications or devices.

In an example, for the provision of LV AC power one or more DC to AC converters are located between the second module and the LV switchgear or the one or more DC to AC converters are located on output connections of the LV switchgear.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A power conversion system, comprising:
   a high voltage (HV) switchgear;
   a solid-state transformer; and
   a low voltage (LV) switchgear;
   wherein the HV switchgear is configured to connect to an HV network and disconnect from the HV network;
   wherein the HV switchgear is configured to connect to an input of the solid-state transformer;
   wherein the solid-state transformer comprises a first module and a second module connected to the first module;
   wherein the first module is configured to convert a HV alternating current (AC) signal from the high voltage network into a HV direct current (DC) signal, and wherein the first module is configured to convert the HV DC signal from the second module into a HV AC signal to be provided to the high voltage network;
   wherein the second module is configured to connect to an output of the first module, wherein the second module is configured to convert the HV DC signal from the first module into at least one LV DC signal, and wherein the second module is configured to convert at least one LV DC signal into an HV DC signal to be provided to the first module;
   wherein the second module comprises at least one sub-module configured to convert the HV DC signal from the first module into the LV DC signal, the submodule comprising a DC to AC converter, a medium frequency transformer, and an AC to DC converter;
   wherein the LV switchgear is configured to connect to an output of the solid-state transformer;
   wherein the LV switchgear is configured to connect to a plurality of applications or devices and to disconnect from the plurality of applications or devices; and
   wherein the system is configured to transfer power from the HV network to the plurality of applications or devices; and
   wherein the system is configured to transfer power from the plurality of applications or devices to the HV network.

2. The power conversion system according to claim 1, wherein the system is further configured to transfer power from the HV network to one or more of the plurality of applications or devices, wherein the HV switchgear is configured to connect to the HV network, wherein the first module is configured to convert a HC AC signal from the HV network into a HV DC signal, wherein the second module is configured to connect to an output of the first module and convert the HV DC signal from the first module into at least one LV DC signal, wherein the second module comprises at least one sub-module, wherein each sub-module is configured to convert the HV DC signal from the first module into a LV DC signal, and wherein the LV switchgear is configured to connect to the one or more of the plurality of applications or devices.

3. The power conversion system according to claim 2, wherein the LV switchgear comprises a plurality of switches, wherein each switch is configured to connect to an application or device, and wherein the LV switchgear is configured to connect the at least one LV DC signal from the second module to the one or more of the plurality of applications or devices.

4. The power conversion system according to claim 2, wherein the LV switchgear is configured to connect the LV DC signal from each sub-module to the plurality of applications or devices.

5. The power conversion system according to claim 2, wherein the second module is configured to utilize a number of sub-modules in series or parallel dependent upon a power demand to the plurality of applications or devices.

6. The power conversion system according to claim 1, wherein the system is configured to transfer power from one or more of the plurality of applications or devices to the HV network, wherein the LV switchgear is configured to connect to the one or more of the plurality of applications or devices, wherein the LV switchgear comprises a plurality of switches, wherein each switch is configured to connect to an application or device, and wherein the LV switchgear is configured to connect at least one LV DC signal from the one or more of the plurality of applications or devices to the second module, wherein the second module is configured to convert the at least one LV DC signal from the one or more of the plurality of applications or devices into an HV DC signal, wherein the second module comprises at least one sub-module, wherein each sub-module is configured to convert a LV DC signal into a HV DC signal, wherein the first module is configured to connect to the second module and convert the HV DC signal into an HV AC signal, and wherein the HV switchgear is configured to connect the HV AC signal from the first module to the HV network.

7. The power conversion system according to claim 6, wherein the LV switchgear is configured to connect to the plurality of applications or devices, and wherein the LV switchgear is configured to connect a plurality of LV DC signals from the plurality of applications or devices to the second module.

8. The power conversion system according to claim 6, wherein the second module is configured to utilize a number of sub-modules in series or parallel dependent upon a power demand from the plurality of applications or devices.

9. The power conversion system according to claim 6, wherein each sub-module comprises an AC to DC converter, a medium frequency transformer and a DC to AC converter, wherein the DC to AC converter is configured to convert the LV DC signal from an application or device into an LV AC signal, wherein the medium frequency transformer is configured to convert the LV AC signal from the DC to AC converter into an HV AC signal, and wherein the AC to DC converter is configured to convert the HV AC signal from the medium frequency transformer into the HV DC signal to be provided to the first module.

10. The power conversion system according to claim 1, wherein the system is configured to transfer power from the HV network to one or more of the plurality of applications or devices and at the same time transfer power from a different one or more of the plurality of applications or devices to the HV network.

11. The power conversion system according to claim 1, wherein the LV switchgear is configured to connect to two or more applications or devices of the plurality of applications or devices to connect the two or more applications or devices to each other.

12. The power conversion system according to claim 1, wherein the LV switchgear is configured to disconnect power from the solid-state transformer.

13. The power conversion system according to claim 11, wherein the LV switchgear is configured to connect the two or more applications or devices to each other.

14. The power conversion system according to claim 1, wherein the solid-state transformer is configured to utilize a number of second modules in parallel dependent upon a power demand to and/or from the plurality of applications or devices.

15. The power conversion system according to claim 1, wherein for providing LV AC auxiliary power one or more DC to AC converters are located between the second module and the LV switchgear or the one or more DC to AC converters are located on output connections of the LV switchgear.

* * * * *